April 18, 1933.  F. A. EVERTS  1,904,042
TOOL HOLDER
Filed March 17, 1932
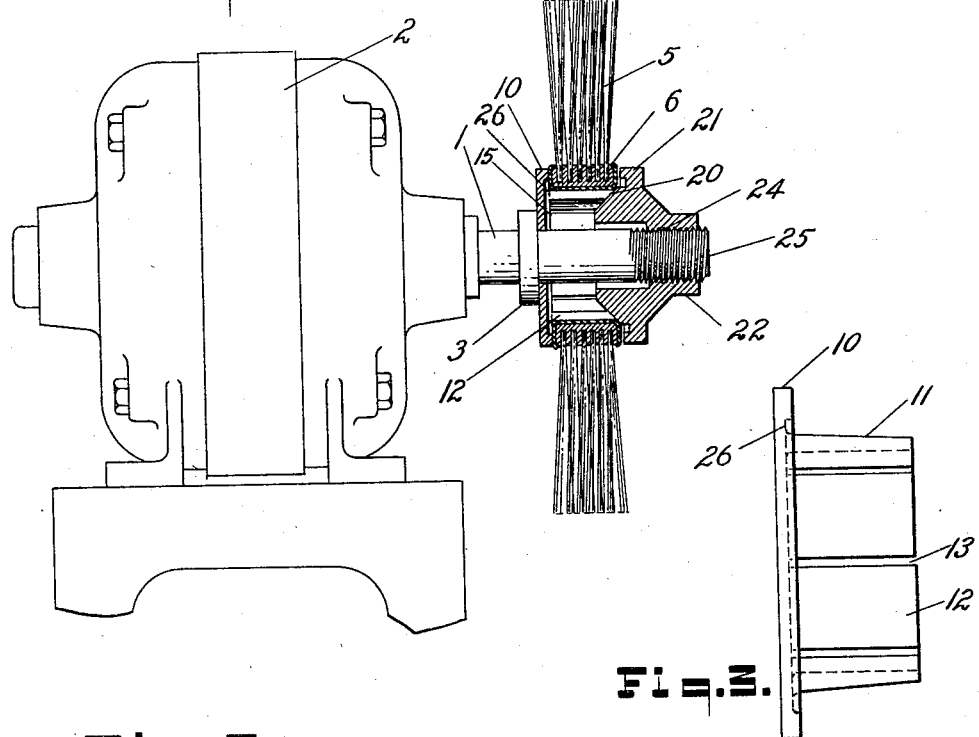
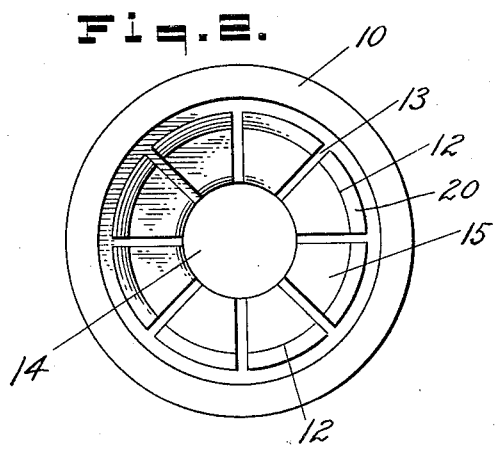
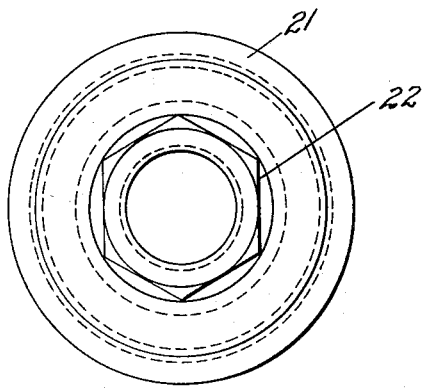
INVENTOR.
Floyd A. Everts.
BY
Barnes, Kisselle & Laughlin
ATTORNEYS.

Patented Apr. 18, 1933

1,904,042

UNITED STATES PATENT OFFICE

FLOYD A. EVERTS, OF DETROIT, MICHIGAN

TOOL HOLDER

Application filed March 17, 1932. Serial No. 599,529.

This invention relates to a tool holder, and it has to do particularly with a holder suitable for such tools as brushes, buffing wheels, or the like.

The object of the invention is the provision of an improved tool holder of simple construction capable of being quickly manipulated for change of buffing wheel or brush, and yet one which is so constructed as to effectively grip and hold the wheel or brush. More particularly the invention is directed towards the provision of an expanding holder which may be in the form of a hub for fitting into a central opening in a buffing wheel or brush and holding the same by expansion action.

In the accompanying drawing:

Fig. 1 is a view of a device constructed in accordance with the invention, illustrating the same mounted upon a motor shaft and holding a buffing wheel or brush.

Fig. 2 is an end elevational view of the expandable element.

Fig. 3 is a side elevation thereof.

Fig. 4 is an end elevation of the nut element.

The holder of the present invention is designed to be placed upon a rotary shaft, as for example, a shaft 1; this shaft may be the shaft of an electric motor 2 or it may be any other sort of a shaft driven by any suitable means. The shaft may and preferably does have an abutment which may taken the form of a collar 3 against which the tool holder of the present invention is designed to abut. A suitable brush is shown having bristles or buffing elements 5 carried by a circular back 6, which it will be understood, may have any desired brush construction.

The holder comprises essentially two co-operating elements, one of which is expandable and the other of which is so formed as to cooperate with the first to effect such expansion. The expansion element is illustrated in Figs. 2 and 3 and it may comprise an integral body having a flange 10 at one side. A hub-like part extends from the flange, as illustrated at 11, and this hub-like element is preferably constructed by a plurality of segments. Such segments are illustrated at 12 and are divided by spaces or kerfs 13. As shown in Fig. 2 the element 11 is constituted by eight segments. As shown in Fig. 3 the spaces or kerfs may extend through the member 11 and substantially up to the flange part 10.

The expansion member has a central aperture therethrough as illustrated at 14 for fitting over the shaft 1. The free ends of the segments are preferably undercut to provide a shape which may be termed inverted frustro-conical form. This affords internal inclined walls 15. The nut element of the holder may comprise an integral piece of metal, one end of which is formed of conical shape as at 20 and which may have a flange 21. One end of the nut member opposite the conical end may be shaped as at 22 for the reception of a tool for turning the same and this nut member has an internal aperture, part of which may be enlarged as at 23 for clearing the shaft and the other provided with internal threads as at 24. The shaft 1 is equipped with threads 25.

The operation and the manner of manipulating the device is as follows: The expansion element is placed over the shaft 1 and it may be positioned up against the collar 3. The buffing wheel or brush may then be placed over the expansion element. In this regard it will be noted that the preferred form is that the hub portion 11 be normally of tapered formation with its largest diameter near the flange 10 and its smaller diameter near its free end. This permits of readily placing the circular back of the brush or buffer over the portion 11 and up against the flange 10. The nut may now be placed over the shaft 1 and threaded onto the same. The conical end 20 enters the inverted frustro-conical portion of the expansion element and engages the inclined walls 15, and as the nut is tightened the segments 12 are expanded and caused to tightly grip the circular back of the brush. It is advantageous that no locking means be used as the threads 25 may be right hand or left hand threads depending upon the relative direction of rotation of the shaft and position of the work during use, so that the use of the buffer or wire brush tends to tighten the nut upon its threads and increase the expanding tendency of the holder element. This also packs the holder up against the collar 20 so that the shaft may drive the same.

The flange 10 may be grooved, as at 26, for weakening the same thus permitting more flexibility in the various segments constituting the hub. The outer peripheral part of the flange 10 and the flange 21 serve as elements to confine the sides of the brush and hold the brush in place, but are preferably so arranged as to not compress the sides of the brush back. The brush back is held by internal pressure due to the expansion of the hub 11 which is adequate for holding the wheel or brush in place.

I claim:

1. A holder for a buffer wheel or the like, comprising a hub-like member provided with a central aperture for disposition over a shaft, said hub-like element having a flange part at one side, segments carried by the flange part, said flange extending radially outward of the segments the free ends of the segments being shaped internally to provide an inverted frustro-conical shape, and a nut element having an internally threaded aperture for being threaded upon the shaft, and having a tapered part for engagement with the inverted conical-shaped formation.

2. The combination with a rotary shaft having a collar and having screw threads thereon spaced from the collar, a hub element having a hub portion composed of separate segments, a flange-like part at one end connecting the segments, said flange-like part being adapted to abut the collar, said hub-like member being normally tapering with its greater diameter near the flange-like part and smaller diameter near the free ends of the segments, said flange part extending radially outwardly of the segments said hub-like element having an inverted frustro-conically shaped formation at the free ends of the segments, and a nut element adapted to be screw threaded upon the shaft and having a conical end for wedging engagement with the frustro-conical formation for expanding the hub-like element, and a flange part extending radially outwardly of the segments.

3. A device for mounting a buffer wheel or the like on a rotary shaft wherein the rotary shaft is provided with a collar fixed against axial movement, the holder member having a disk like body with an aperture therethrough adapted for insertion over the shaft and abutment against the collar, a plurality of segmental fingers projecting from one side of the disk-like body, the periphery of the body extending radially outwardly of said fingers and constituting a flange, said segmental fingers providing a hub like portion spaced from the shaft, and said hub like portion being of tapering formation normally with its greater diameter near the body and its lesser diameter near the free ends of the segmental fingers, the internal portions of the free ends of the segmental fingers being beveled to provide an inverted frustro-conical shape, and a nut member screw threaded onto the shaft, said nut member having a portion with a frustro-conical surface adapted to project into the hub like structure provided by the segmental fingers, said hub like portion being adapted to receive a buffer wheel or the like and to expand and hold the same by reason of the tightening of the nut against the beveled edges of the fingers, said nut having a flange extending radially outwardly of the said segmental fingers and normally out of contact therewith, and this said flange and the flange part of the disk body being adapted to overlap opposite sides of the buffer wheel or the like for preventing axial shift thereof.

In testimony whereof I affix my signature.

FLOYD A. EVERTS.